Nov. 9, 1926.
J. S. WILSON
1,606,552
CUSHION SPRING HANGER
Filed May 25, 1922
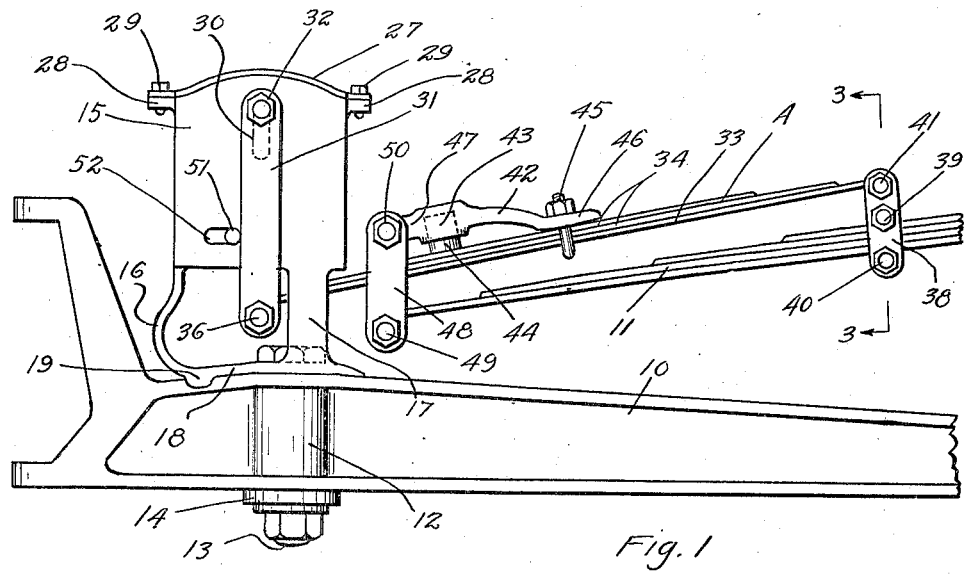
Fig. 1
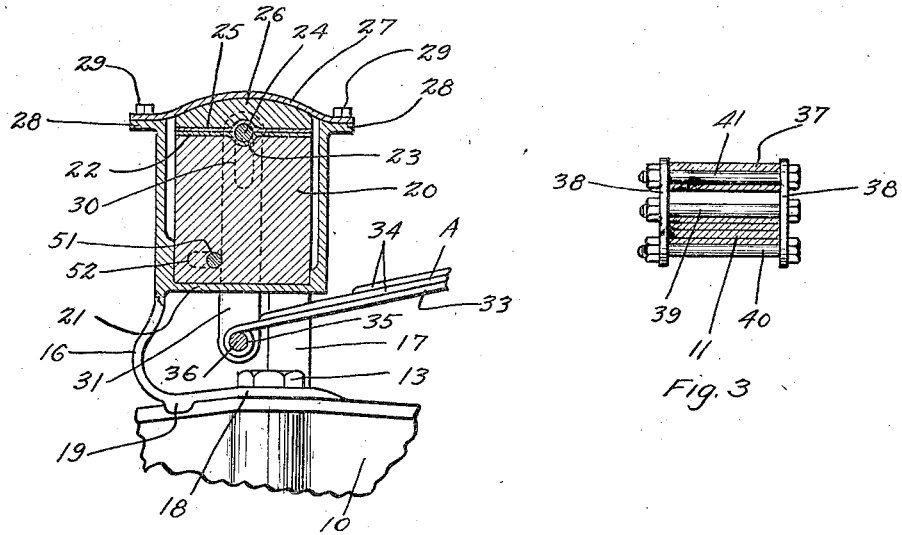
Fig. 2
Fig. 3
Inventor:
James S. Wilson
By: Fisch & Lagaard,
his Attorneys.

Patented Nov. 9, 1926.

1,606,552

UNITED STATES PATENT OFFICE.

JAMES S. WILSON, OF BRAINERD, MINNESOTA, ASSIGNOR OF ONE-HALF TO ERNEST F. NILES, OF MERRIFIELD, MINNESOTA.

CUSHION SPRING HANGER.

Application filed May 25, 1922. Serial No. 563,509.

My invention relates to cushion spring hangers for motor vehicles and has for its object to provide a shock absorber comprising an auxiliary spring which spring is positioned over the end of the main spring and is hung by means of the shackle attached to the central portion of the same.

Another object is to attach the end of the main spring by means of a shackle to a rubber covered clip attached to the auxiliary spring.

A still further object is to support the extreme end of the auxiliary spring on a rubber block carried by a casing adapted to permit the same to move upwardly and downwardly to take the jar from the road.

It is also a feature of the invention to provide a member in said rubber block for absorbing shocks resolving from lateral movement of the axle relative to the frame of the vehicle.

The full objects and advantages of my invention will appear in connection with the detailed description thereof and are particularily pointed out in the claims.

In the drawings forming part of this specification:

Fig. 1 is a side elevational view of a portion of an axle of a vehicle and main spring thereof showing the manner of applying my invention thereto.

Fig. 2 is a sectional view of a portion of the device shown in Figure 1.

Fig. 3 is a sectional detail view taken on line 3—3 of Figure 1.

In the drawings I have shown portions of the front axle 10 of the motor vehicle having a main spring 11 extending in longitudinal direction over the said axle and terminating short of the end of the same. The end of the axle 10 is formed with a boss 12 through which a bolt 13 may be passed to secure the radius rod 14 thereto.

My invention consists primarily of a rectangular casing 15 which is provided with three legs 16 and 17 issuing outwardly therefrom which legs all connect with a flat base 18 at the lower portion of the same. Base 18 is adapted to lie upon the upper portion of the axle 10 immediately over the boss 12. The entire casing 15 is held in place by means of the bolt 13 which passes through said base 18. To prevent the device from rotating upon the axle 10 base 18 is provided with depending arms 19 which straddle the axle on either side thereof.

Within the casing 15, I provide a rubber block 20 which rests on the bottom 21 of said casing. This block is provided with a plate 22 which fits across the top of the same and which is formed with a groove 23 extending across it in which a pin 24 may be positioned. Plate 25, similar to plate 22, is placed on top of the said plate 22 and covers the pin 24. In addition to this plate a rubber cover member 26 is provided which is positioned on top of the plate 25. For holding all of these parts in place a cover 27 is used in which is held two flanges 28 formed of bolts 29. In this construction a device is provided whereby pressure may be exerted on the pin 24 to compress the rubber block 20. At the same time all of the parts are rigidly held in place by means of the cover 27 so that the pin 24 is always properly positioned within the structure.

As can best be seen in Figures 1 and 2 the walls of casing 15 are provided with vertical slots 30 through which the pin 24 may pass and through which said pin is movable as the rubber block is expanded and compressed. Upon the exterior of the device I provide two shackles 31 which are hung from the pin 24 and held in place thereon by means of nuts 32. These shackle arms hang downwardly below the bottom 21 of casing 15 where the same have attached to them the auxiliary spring to be presently described.

The auxiliary spring of my invention comprises a main leaf 33 together with a number of auxiliary leaves 34 positioned upon the same. This main leaf is formed at one end with an eye 35 through which a bolt 36 is adapted to pass by means of which the said eye may be attached to the lower portion of the shackles 31. The other end of the leaf 33 is formed with an eye 37 by means of which said spring is attached to the main spring 11 of the vehicle proper. The means for attaching this spring comprises two clips 38 which are rigidly bolted to the spring 11 through two bolts 39 and 40 and by means of which the said eye 37 is attached thereto through a bolt 41. In this structure the clips 38 are rigidly held to the spring 11 while the leaf 33 is pivotally connected to the upper portion of said clips.

In the centers of the auxiliary spring of my invention I provide an arm 42 which is formed with a socketed head 43 adapted to receive a rubber plug 44 which bears upon the center of the leaves 34 of this spring. This arm is secured to the auxiliary spring of the invention by means of a U-bolt 45 which passes through a flattened end 46 of the said arm. The surface of this flattened portion where the same bears upon the spring is slightly curved so that the arm 42 may rock a slight amount upon the top leaf of the auxiliary spring at the point of connection of the same. The other end of arm 42 is formed with an eye 47 which is connected to the point of the main spring 11 by means of two shackles 48 and bolts 49 and 50.

The operation of my invention is as follows. When the load is applied to the spring 11 the same is forced downwardly carrying with it the auxiliary spring A which causes pressure to be exerted upon the plug 44 and the clips 38. This in turn causes pressure to be exerted upon the arms 31 which immediately compress the rubber plug 20 within the casing 15. As the axle 10 rebounds due to the irregularity of the road over which it passes spring A gives the vehicle additional resiliency whereas the rubber plug 44 and rubber block 20 cushion the action of the vehicle so that the same travels exceedingly smooth over rough roads.

To limit the longitudinal movement of the spring laterally relative to the chassis, I provide a pin 51 which passes through slotted opening 52 and the walls of the casing 15, which pin is rigidly secured within the rubber block 20. This pin is positioned relative to the shackle members 31 so that in normal position the said pin engages the sides thereof. As the axle is thrust from side to side relative to the frame of the vehicle the pins 51 are forced outwardly within the slots 52 causing the rubber block 20 to compress readily thereby cushioning the lateral movement of the frame and axle of the vehicle.

Although I have shown my spring as attached to the front spring and axle of a motor vehicle having a single transverse spring it can readily be comprehended that the device may be attached to the rear spring or to any other spring desired which is substantially secured in rigid position. The adaptability of the invention is therefore substantially universal.

The cushioning means provided within the casing 15 takes up the slight jars and wear which ordinarily are carried by the shackle connections and the pins which pivotally hold the springs to the frame. This cushion means within the housing 15 of the plug 44 hold the main spring together with the auxiliary spring in a firm connection with the axle 10 of the chassis but not rigid as is true with the ordinary shackle connections, so that the wear on these parts is materially reduced and all of the little vibrations together with the heavier shocks transmitted to the spring are absorbed to a great extent by the cushioning means within the casing. This construction provides a means associated with the auxiliary spring for supporting the body of the vehicle in a manner to hold it firmly in place yet do away with the rigid connection by the springs of the shackles.

The advantages of my invention are manifest. A three point suspension for the spring is provided which does not affect the operation of the main spring of the vehicle and which further gives the resiliency of the auxiliary spring in addition thereto. In addition the device reinforces the main spring so that a portion of the load is carried by the auxiliary spring thereby releasing the main spring of a part of the load, the rubber block and plug serving to cushion the action of the device so that a structure is provided which is exceedingly resilient and which eliminates the greater percentage of jars encountered in traveling over rough roads.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

I claim:—

1. In combination with the spring of a motor vehicle, an auxiliary spring positioned above the same, a member secured to said vehicle spring inwardly from the outer end thereof, means for pivotally connecting said auxiliary spring to said member, an arm pivoted to said auxiliary spring inwardly from the outer end thereof and a shackle pivoted at one end to said arm and at its other end to the outer end of said main spring.

2. In combination with the spring of a motor vehicle, an auxiliary spring positioned above the same, a member secured to said vehicle spring inwardly from the outer end thereof, means for pivotally connecting said auxiliary spring to said member, an arm pivoted to said auxiliary spring inwardly from the outer end thereof, a shackle pivoted at one end to said arm and at its other end to the outer end of said main spring and a cushion member interposed between said arm and said auxiliary spring.

3. In combination with the spring of a motor vehicle, an auxiliary spring positioned above the same, a member secured to said vehicle spring inwardly from the outer end thereof, means for pivotally connecting said auxiliary spring to said member, an arm positioned above said auxiliary spring, means for supporting said arm in rocking relation to said auxiliary spring, means for pivotally connecting the outer end of said vehicle spring to said arm and cushion means interposed between said arm and said auxiliary spring.

4. A spring hanger including an auxiliary spring attached to the outer end of the main spring of a vehicle, and resilient non-metallic means interposed between the outer end of the auxiliary spring and the axle of the vehicle whereby the auxiliary spring is held firmly in position and said resilient means is adapted to co-act with said springs of the vehicle to take up the shock and vibrations between the axle and the auxiliary spring.

5. A spring hanger in combination with the main spring of a vehicle, said hanger including an auxiliary spring, one end of which is secured inwardly of the outer end of the main spring, means connecting the outer end of the main spring with said auxiliary spring, and non-metallic means interposed between the outer end of the auxiliary spring and the axle of said vehicle whereby sharp vibrations are absorbed in said resilient means before being transmitted to said springs.

6. A spring hanger in combination with the main spring of a vehicle including an auxiliary spring, means for securing said auxiliary spring to the main spring, non-metallic cushioning means, a housing for enclosing said cushioning means secured to the axle of the vehicle, and means for connecting the outer end of the auxiliary spring to the cushioning means in said housing.

7. In combination with the spring of a motor vehicle, an auxiliary spring positioned above the same and pivoted at one end to said vehicle spring, an arm pivoted to said auxiliary spring, means for connecting said arm with said vehicle spring and cushion means interposed between said arm and said auxiliary spring.

8. In combination with the spring of a motor vehicle, an auxiliary spring therefor, means for attaching said auxiliary spring to said vehicle spring, including an arm pivoted to said auxiliary spring and cushion means interposed between said arm and said auxiliary spring.

9. In combination with the axle and spring of a motor vehicle, a casing secured to said axle, a rubber cushion member positioned within the said casing, an auxiliary spring connected with said cushion member and means for attaching said auxiliary spring to said vehicle spring.

10. In combination with the axle and spring of a motor vehicle, a casing secured to said axle, a rubber cushion member positioned within the said casing, an auxiliary spring connected with said cushion, means for attaching said auxiliary spring to said vehicle spring, said attaching means including an arm pivoted to said auxiliary spring and a cushion member attached to said pivoted arm, and bearing directly upon said pivoted arm.

11. In combination with the axle and spring of a motor vehicle, a casing having a number of legs, a base attached to said legs, a bolt passing through said axle for attaching the said base and casing thereto, a rubber block within the casing, a pair of slotted holes on the sides of said casing, a pair of plates positioned on the top of said rubber block having grooves therein, a pin positioned within said grooves and extending through the slots in said casing, a cover member for said casing, and means for attaching said vehicle spring to said pin.

12. In combination with the axle and spring of a motor vehicle, a casing having a number of legs, a base attached to said legs, a bolt passing through said axle for attaching the said base and casing thereto, a rubber block within the casing, a pair of slotted holes on the sides of said casing, a pair of plates positioned on the top of said rubber block having grooves therein, a pin positioned within said grooves and extending through the slots in said casing, a cover member for said casing, an auxiliary spring pivotally connected to said pin and means for attaching said auxiliary spring to said vehicle spring.

13. A spring hanger adapted to support the outer end of the spring of a vehicle including a short auxiliary spring, one end of which is pivotally secured inwardly of the outer end of the main spring, a lever arm secured to said auxiliary spring, shackle means for connecting said lever arm to the outer end of the main spring, a housing supported by the chassis of the vehicle, resilient means within said housing, a shackle connecting the outer end of said auxiliary spring to said resilient means and means engaging the last mentioned shackle to hold said auxiliary spring as well as the main spring against free longitudinal expansion.

In testimony whereof I affix my signature.

JAMES S. WILSON.